L. B. SWIFT.
RECORDING INSTRUMENT.
APPLICATION FILED JUNE 28, 1917.
1,367,520.
Patented Feb. 1, 1921.
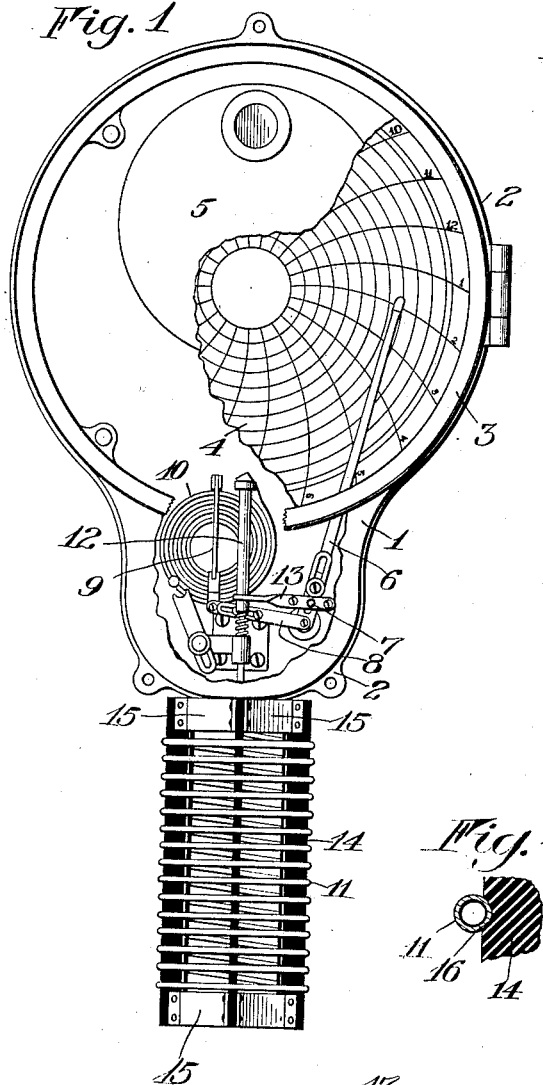
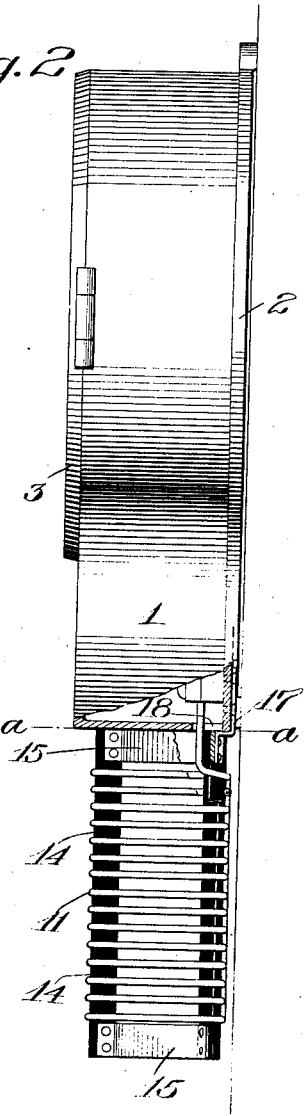
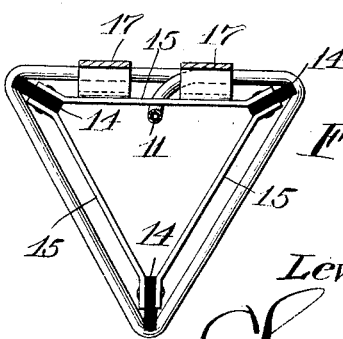
WITNESSES:
Francis Jurdone Jr
Agnes Nesbitt Bissell
INVENTOR
Lewis B. Swift
BY
his ATTORNEYS

UNITED STATES PATENT OFFICE.

LEWIS B. SWIFT, OF ROCHESTER, NEW YORK, ASSIGNOR TO TAYLOR INSTRUMENT COMPANIES, OF ROCHESTER, NEW YORK, A CORPORATION OF NEW YORK.

RECORDING INSTRUMENT.

1,367,520.

Specification of Letters Patent.

Patented Feb. 1, 1921.

Application filed June 28, 1917. Serial No. 177,467.

*To all whom it may concern:*

Be it known that I, LEWIS B. SWIFT, of Rochester, in the county of Monroe and State of New York, have invented certain new and useful Improvements in Recording Instruments; and I do hereby declare the following to be a full, clear, and exact description of the same, reference being had to the accompanying drawings, forming a part of this specification, and to the reference characters marked thereon.

The present invention has for its object to provide an indicating or recording instrument especially adapted for accurately indicating and recording temperatures, particularly under conditions where it is deemed advisable to maintain a more or less even temperature for a given length of time. A further object of the invention is to provide a rigid support or frame adapted to be connected with a recording instrument for holding a capillary or thermometer tube in fixed relation with respect to the instrument, whereby the same may be calibrated without fear of having the relative position of the tube changed after the instrument has been tested and adjusted. To these and other ends the invention consists in certain improvements and combinations of parts, all as will be hereinafter more fully described, the novel features being pointed out in the claims at the end of the specification.

In the drawings:

Figure 1 is a front elevation of the instrument with a part of the casing broken away to show the operating mechanism;

Fig. 2 is a side elevation with the lower portion of the casing shown in section to illustrate the manner of attaching the tube supporting frame to the casing;

Fig. 3 is an enlarged sectional plan taken on line *a—a* of Fig. 2, and

Fig. 4 is a detail view illustrating the manner of supporting the capillary tube upon the insulation of the upright frame.

Similar reference characters throughout the several views indicate the same parts.

An instrument constructed in accordance with my present invention is adapted particularly for indicating and recording temperatures under various conditions where it is desired to secure an extremely accurate and reliable record, especially in the carrying out of different processes of manufacture where continuously recorded temperatures are required.

The advantage of the present invention lies in the fact that the position of the capillary tube is fixed relatively to the expanding coil before the instrument is calibrated which insures accuracy in the temperature indications thereafter. Owing to the small diameter and flexibility of the capillary tubing the bore will be distorted in case the tube is bent, thereby changing the volume of the tube or bulb and consequently increasing or decreasing the pressure on the liquid, the effect being to open or close the expansion coil for moving the registering arm which would result in rendering the instrument more or less inaccurate. By permanently fixing the capillary tube so that it is not movable or shiftable after the instrument has been calibrated the danger or chance of its becoming bent or distorted is very slight.

In illustrating the preferred embodiment of my invention I have shown a recording instrument comprising a casing 1 mounted on a backing or support 2 having a hinged cover or door 3 provided with a suitable glass panel through which the rotatable chart 4 is visible, the chart being driven by a suitable clock mechanism contained in the casing 5.

The recording mechanism comprises the stylus supporting arm 6 which is pivoted at 7 and operated by the link 8 and connection 9 controlled by the expansion coil 10 at the end of the capillary tube or bulb 11, the upper end of the latter being soldered, brazed, or secured in some other suitable manner to the fixed end of the expansion coil 10, as well understood in the art. A thumb screw 12 is operatively connected with the arm 6 through the lever 13, whereby said arm may be adjusted to the desired position at the proper time. The capillary tube 11 consists of a length of small diameter flexible metal tubing constructed of copper, bronze or other suitable material. The tube below the casing 1 is wound preferably upon a triangular frame comprising the upright members 14 formed of strips of any suitable insulating material and connected by the upper and lower straps 15 as shown in Fig. 3. The insulation strips 14 are notched as indicated at 16 in Fig. 4, to receive the capillary tubing as shown, whereby the coils of the tubing are held in proper position upon the frame. The frame is connected with the base or support 2 of the instrument by means of the brackets 17, the lower ends of which are secured upon the upper rear strap 15 of the frame, while the upper ends of the brackets are secured to the base of the instrument as shown in Fig. 2. In order that the casing 1 may be placed upon or removed from the base 2 without in any way disturbing the capillary tube 11 I have provided in the back edge of the bottom wall of the casing a slot or notch 18 through which the tube extends, as shown in Fig. 2. With this construction the instrument may first be calibrated before the casing is placed upon the base and when the recording mechanism is properly adjusted the casing is then secured in position upon the base.

The capillary tube is filled with any suitable expansive fluid, such as mercury, the expansion coil or active end of the tube being mounted upon the base of the instrument and connected up with the recording mechanism proper, while the portion of the tube below the casing is tightly wound upon the rigid frame within the notches 16 in which the several coils are supported in predetermined relation upon the frame.

The instrument is constructed in such a way that it may be assembled complete with the exception of the case, and then calibrated by immersing the tube supporting frame in various testing baths and adjusting the mechanism to insure the correct indications of the pen point or stylus across the temperature scale or paper chart from which the readings are taken.

Owing to the small diameter and flexibility of the capillary tube the bore will be distorted in case the tube is bent or "kinked" after the instrument is set up, which will change the volume thereof and increase or decrease the pressure on the liquid contained therein, the effect being to open or close the expanding coil within the casing, and to increase or decrease the amount of liquid contained in the tube, thereby rendering inaccurate the indications on the chart. The amount of inaccuracy in degrees of temperature will not be constant across the temperature scale or chart and each time the tube is bent the error will be amplified or at least changed. However, the present construction obviates the difficulties heretofore experienced with capillary tubes which were not fixed relatively to the instrument. The rigid frame construction beneath the casing permits of the use of a capillary tube of considerable length, thereby exposing a large surface to the medium of which the temperature is to be measured. The wall of the tube is thin and of such material that the transmission of heat from the outside medium to the liquid or vice versa is very rapid and by constructing the frame of insulation of just sufficient size to support the tube rigidly, conduction of heat from the tube to and from the casing is practically eliminated. The size of the parts of the frame is such that the capillary tube is practically unaffected by the heat stored in them.

While I have shown a triangular frame it will be understood that I do not limit myself to this particular form of construction, as other forms may be readily substituted without departing from the spirit of the invention.

I claim as my invention:

1. A recording instrument having connected therewith a thermometer capillary extension tube containing an expansive fluid and a frame located exteriorly of the instrument upon which said tube is wound.

2. A recording instrument, a capillary tube containing an expansive fluid connected with said instrument and a support connected with the instrument provided with notches arranged to receive the tube, said tube being wound upon the support in said notches.

3. A recording instrument having connected therewith a capillary tube containing an expansive fluid and a frame comprising spaced members rigidly connected with the instrument and supporting said tube.

4. A recording instrument having connected therewith a capillary extension tube containing an expansive fluid and a frame comprising spaced bars of insulation material each having a plurality of notches formed therein, said tube being wound upon the frame within the notches.

5. In a recording instrument, the combination with a base and an indicating mechanism mounted thereon, of a frame located at one side of the base, a capillary tube containing an expansive fluid wound upon the frame and connected with said indicating mechanism, and a casing for said mechanism arranged to be inserted upon and removed from the base without effecting a change in position of the tube and frame.

LEWIS B. SWIFT.